United States Patent
Ishii

(10) Patent No.: US 7,660,020 B2
(45) Date of Patent: Feb. 9, 2010

(54) METHOD AND APPARATUS FOR CONTROLLING IMAGE PROCESSING FOR EXTRACTION ASSURED EMBEDDING, AND RECORDING MEDIUM STORING PROGRAM PRODUCT

(75) Inventor: Masaki Ishii, Kanagawa-Ken (JP)

(73) Assignee: Ricoh Company, Ltd., Tokyo (JP)

( * ) Notice: Subject to any disclaimer, the term of this patent is extended or adjusted under 35 U.S.C. 154(b) by 501 days.

(21) Appl. No.: 11/448,108

(22) Filed: Jun. 7, 2006

(65) Prior Publication Data

US 2008/0144115 A1    Jun. 19, 2008

(30) Foreign Application Priority Data

Jun. 7, 2005    (JP) .............................. 2005-166431

(51) Int. Cl.
H04N 1/40    (2006.01)
(52) U.S. Cl. ...................................... 358/3.28; 358/448
(58) Field of Classification Search ................. 358/1.9, 358/2.1, 3.28, 450, 448, 468
See application file for complete search history.

(56) References Cited

U.S. PATENT DOCUMENTS

| 5,444,779 | A * | 8/1995 | Daniele ........................ 399/366 |
| 6,205,249 | B1 * | 3/2001 | Moskowitz .................. 382/232 |
| 6,535,616 | B1 * | 3/2003 | Hayashi et al. ............. 382/100 |
| 6,707,465 | B2 * | 3/2004 | Yamazaki et al. ........... 345/629 |
| 6,975,770 | B2 | 12/2005 | Kondo et al. |
| 7,487,356 | B2 | 2/2009 | Kunisa |

FOREIGN PATENT DOCUMENTS

| JP | 06-231466 | 8/1994 |
| JP | 07-225803 | 8/1995 |
| JP | 2000-138815 | 5/2000 |
| JP | 2001-285622 | 10/2001 |
| JP | 2003-179740 | 6/2003 |
| JP | 2003-209676 | 7/2003 |
| JP | 2003-244419 | 8/2003 |
| JP | 2004-080136 | 3/2004 |
| JP | 2005-20436 | 1/2005 |
| JP | 2005-117154 | 4/2005 |
| WO | WO2004/084539 | 9/2004 |

* cited by examiner

*Primary Examiner*—Thomas D Lee
*Assistant Examiner*—Stephen M Brinich
(74) *Attorney, Agent, or Firm*—Oblon, Spivak, McClelland, Maier & Neustadt, L.L.P.

(57) ABSTRACT

An image processing method includes acquiring an original image, acquiring original information, generating overlay information, determining where to embed the overlay information, evaluating whether the overlay information is embeddable in the original image, and controlling image processing according to a result of the evaluation. The image processing apparatus includes an image acquisition mechanism for acquiring an original image, an information acquisition mechanism for acquiring original information and generating overlay information, an embed position determination mechanism for determining where to embed a bit of the overlay information, an embed evaluation mechanism for evaluating whether the overlay information is embeddable in the original image, and an image processing control mechanism for controlling image processing according to a result of the evaluation. A computer readable storage medium storing a computer program product which causes the image processing apparatus to perform the image processing method.

12 Claims, 8 Drawing Sheets

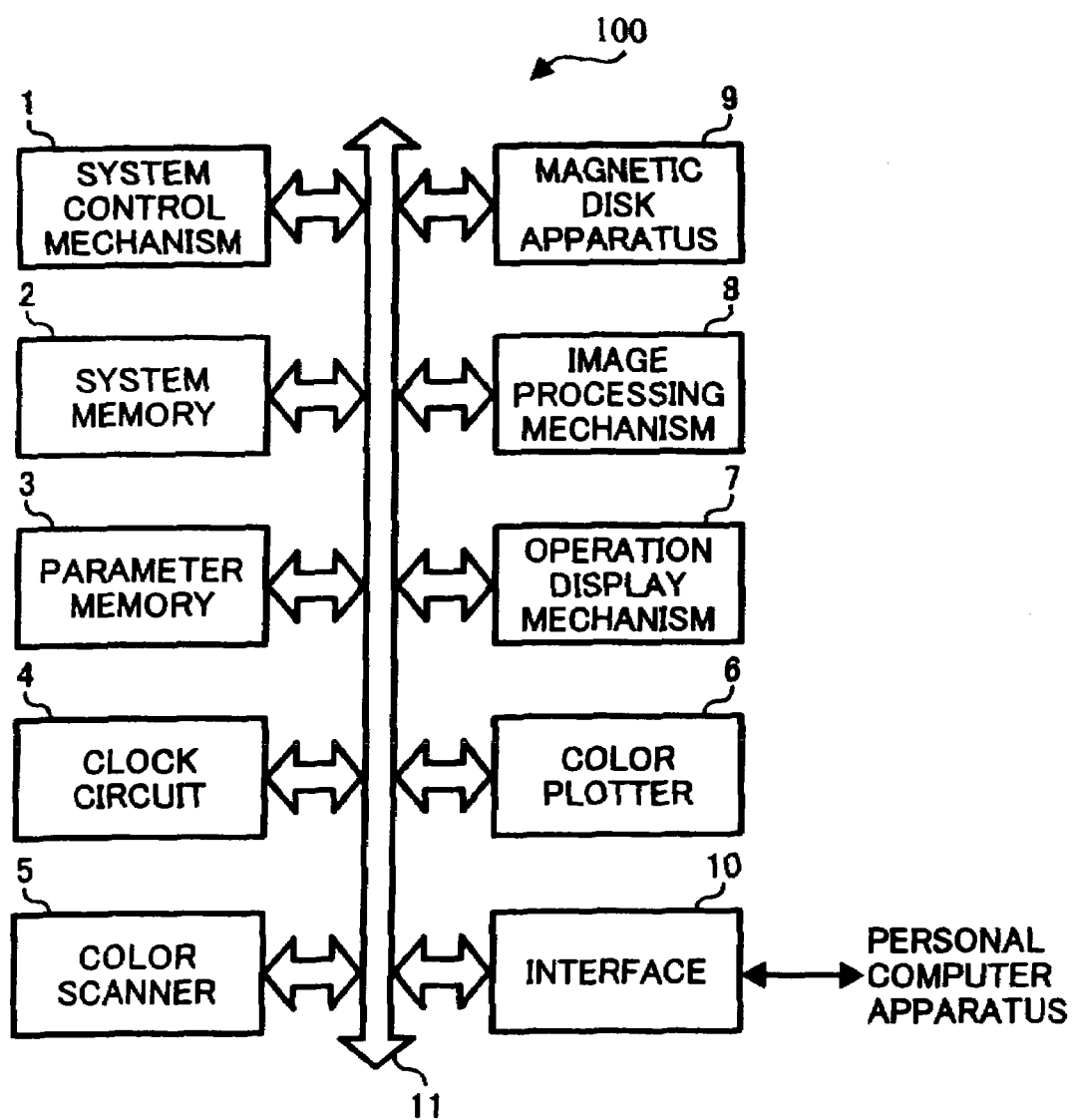

FIG. 2A
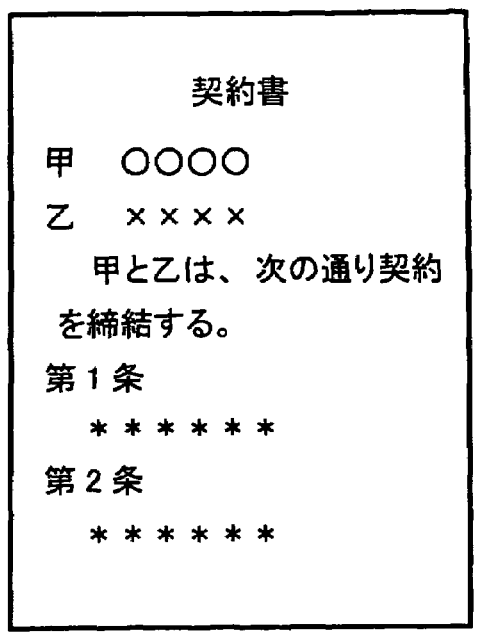
FIG. 2B
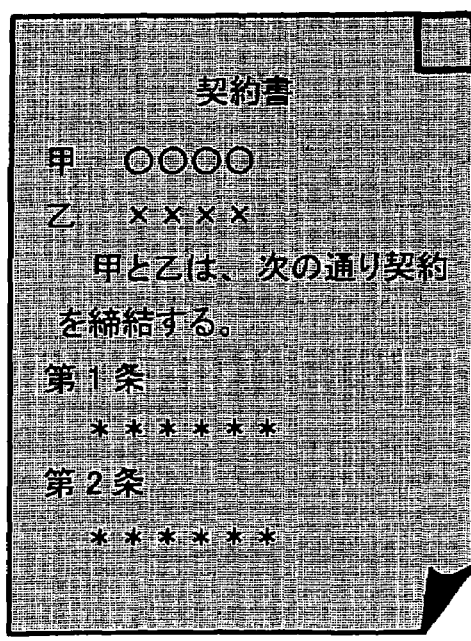
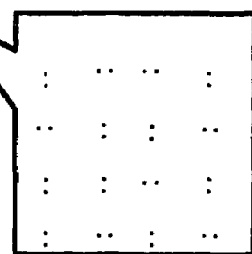
FIG. 2C

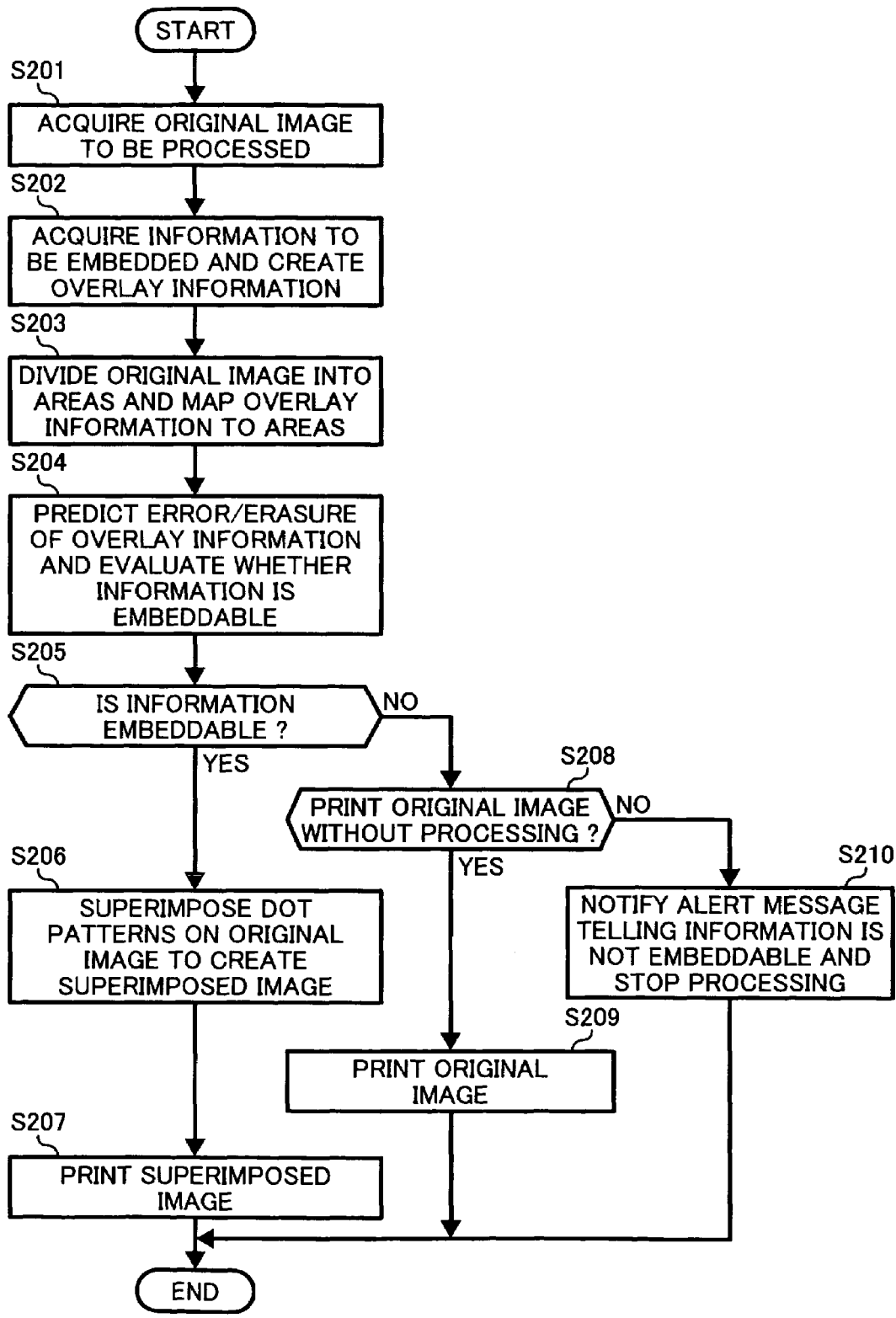

ORIGINAL IMAGE

RESULTING IMAGE

METHOD AND APPARATUS FOR CONTROLLING IMAGE PROCESSING FOR EXTRACTION ASSURED EMBEDDING, AND RECORDING MEDIUM STORING PROGRAM PRODUCT

CROSS-REFERENCE TO RELATED APPLICATIONS

This application is based upon and claims the benefit of priority from prior Japanese patent application, No. JP2005-166431 filed on Jun. 7, 2005, in the Japan Patent Office, the entire contents of which are incorporated herein by reference.

BACKGROUND OF THE INVENTION

1. Field of the Invention

The present invention relates to a method and an apparatus for image processing, and a recording medium storing a computer program product for image processing, and more particularly to a method and an apparatus for controlling image processing to perform extraction assured embedding, and a recording medium storing a computer program product for controlling image processing.

2. Discussion of the Background Art

Recently, background art has been developed to add value to a print material which serves as a recording medium. The background art embeds information in the print material in addition to its original contents so that a value-added print material can be provided. Examples of information to be embedded in a print material include information for a security purpose, information to protect contents of the print material, a link to source data of the print material such as digital data and a web page, and so forth. The background art embeds such information by arranging a predetermined pattern on a print material.

An example of the background art uses a dot code to embed information in a print material. In the example, a reference point referred to as a marker is arranged at each of four corners of the print material, and a plurality of blocks including dot images representing the information are arranged inside an area enclosed by the markers.

Another example of the background art adopts a spatial reference method of a self-clocking glyph code and an optically readable record to embed information in a print material. In the example, patterns including a slash mark and a backslash mark representing the information are two-dimensionally arranged in a background of the print material.

The contents of the print material indicate whether information is embedded in the print material. To extract information from the print material, a mechanism needs to initially check whether the information is able to be embedded.

SUMMARY OF THE INVENTION

This patent specification describes an image processing method including acquiring an original image to be processed, acquiring original information to be embedded, generating overlay information including the original information, determining a position in the original image to embed a bit of the overlay information, evaluating whether the overlay information is able to be embedded (embeddable) in the original image, and controlling image processing so as to select an image processing operation according to a result of the evaluation. This patent specification further describes an image processing apparatus, including an image acquisition mechanism configured to acquire an original image to be processed, an information acquisition mechanism configured to acquire original information to be embedded and to generate overlay information including the original information, an embedding (embed) position determination mechanism configured to determine a position in the original image for which to embed a bit of the overlay information, an embedding (embed) evaluation mechanism configured to evaluate whether the overlay information is able to be embedded in the original image, and an image processing control mechanism configured to control image processing so as to select an image processing operation according to a result of the evaluation. This patent specification further describes a computer readable storage medium storing a computer program product for causing the image processing apparatus to perform the image processing method.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a block diagram illustrating a configuration of an image processing apparatus according to an example embodiment of the present invention;

FIG. 2A is an illustration of an original image to be processed by the image processing apparatus;

FIG. 2B is an illustration of the original image with information embedded by using two types of dot patterns;

FIG. 2C is an enlarged view of the two types of dot patterns shown in FIG. 2B;

FIG. 10 is another operational flowchart of the system control mechanism of the image processing apparatus;

DETAILED DESCRIPTION OF EXAMPLE EMBODIMENTS

Figure 3:
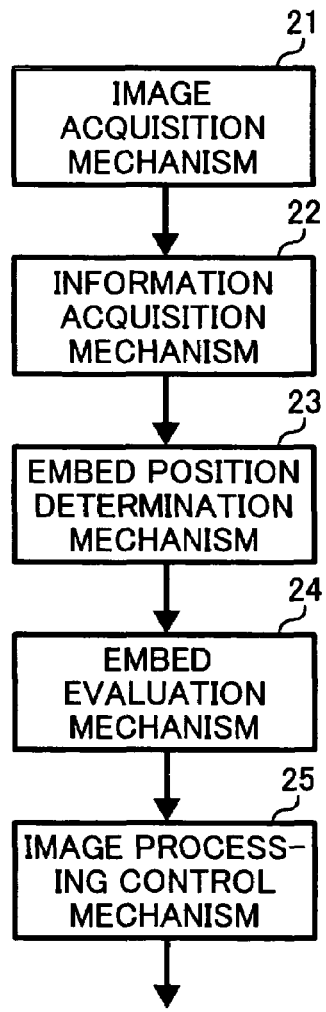
FIG. 3 is a block diagram illustrating components of a system control mechanism of the image processing apparatus.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, an image processing apparatus according to an example embodiment of the present invention is described.

FIG. 1 illustrates a general configuration of an image processing apparatus 100 serving as a multifunction apparatus including copy and print functions according to an example embodiment of the present invention.

As shown in FIG. 1, components of the image processing apparatus 100 include a system control mechanism 1, a system memory 2, a parameter memory 3, a clock circuit 4, a color scanner 5, a color plotter 6, an operation display mechanism 7, an image processing mechanism 8, a magnetic disk apparatus 9, an interface 10 to a personal computer (PC) apparatus, and an internal bus 11.

The components of the image processing apparatus 100 have functions described below.

The system control mechanism 1 executes a control program for controlling the components of the image processing apparatus 100 and applications for performing the copy and print functions. The system memory 2 stores the control program executed by the system control mechanism 1, and various types of data needed for executing the control program. Further, the system memory 2 serves as a work area for the system control mechanism 1. The parameter memory 3 stores various types of information unique to the image processing apparatus 100. The clock circuit 4 outputs current time information.

The color scanner 5 reads an original image at a predetermined resolution in full color. The color plotter 6 records and outputs an image at a predetermined resolution in either full color or bicolor (including monochrome). The operation display mechanism 7 provides a mechanism for operating the image processing apparatus 100. The operation display mechanism 7 includes various types of operation keys and various types of display devices.

The image processing mechanism 8 performs various types of image processing operations on image data of the original image acquired by using the color scanner 5. The magnetic disk apparatus 9 stores the image data, and various types of data files.

The interface 10 connects the PC apparatus (not shown) to the image processing apparatus 100.

The components including the system control mechanism 1, the system memory 2, the parameter memory 3, the clock circuit 4, the color scanner 5, the color plotter 6, the operation display mechanism 7, the image processing mechanism 8, the magnetic disk apparatus 9, and the interface 10 are connected to the internal bus 11. The components exchange data with each other mainly through the internal bus 11.

In the image processing apparatus 100 according to an example embodiment of the present invention, a background art for embedding information is used. An example of the background art uses small dot patterns arranged on a grid to embed information in a print material. In an example embodiment of the present invention, two types of dot patterns are used to embed information in a print material. In detail, the two types of dot patterns are arranged to represent the information to be embedded, and the arranged dot patterns are overlaid on the print material. One dot pattern ". ." represents a bit having a value of zero (a bit "0"), and the other dot pattern ":" represents a bit having a value of one (a bit "1").

For example, if a digital image as shown in FIG. 2A is acquired, dot patterns representing information to be embedded are superimposed on the digital image to create a print material having the digital image with the information embedded as shown in FIG. 2B. FIG. 2C shows an enlarged view of the superimposed dot patterns.

FIG. 3 illustrates components included in the system control mechanism 1 according to an example embodiment of the present invention. As shown in FIG. 3, components of the system control mechanism 1 include an image acquisition mechanism 21, an information acquisition mechanism 22, an embed position determination mechanism 23, an embed evaluation mechanism 24, and an image processing control mechanism 25.

Next, functions of the components of the system control mechanism 1 are described below.

The image acquisition mechanism 21 acquires an original image in which information is to be embedded by using, for example, the color scanner 5.

The information acquisition mechanism 22 acquires original information to be embedded in the original image acquired by the image acquisition mechanism 21, and generates overlay information from the original information. In detail, the information acquisition mechanism 22 encodes the original information according to a known method using error/erasure-correcting codes (also referred to as error-correcting codes) such as Bose-Chaudhuri-Hocquenghem (BCH) codes and Reed-Solomon (RS) codes to generate correction information. The information acquisition mechanism 22 adds the correction information to the original information to generate the overlay information.

Figure 4:
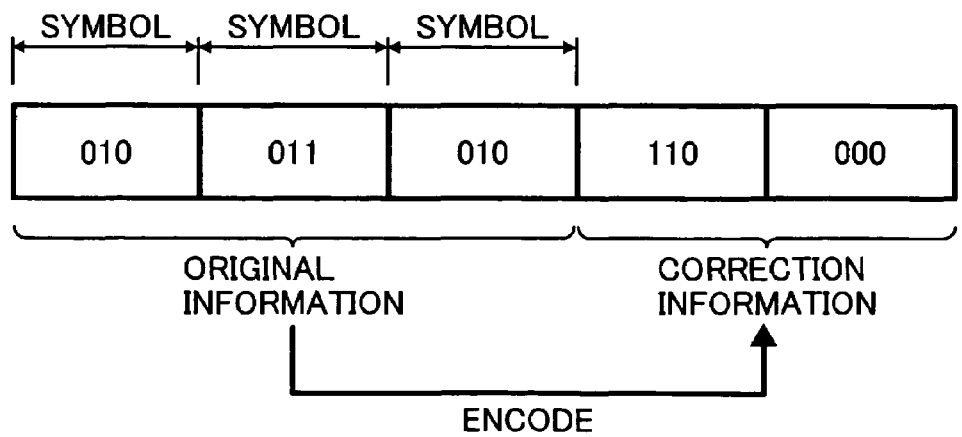
FIG. 4 is a schematic illustration for explaining error/erasure-correcting codes and overlay information.

An example of the overlay information in shown in FIG. 4. In the example, original information to be embedded is added with correction information generated by encoding the original information so that overlay information is generated. The overlay information includes a plurality of symbols each including at least one bit of the overlay information. When either an error or an erasure in the overlay information occurs, the overlay is corrected in units of a symbol. As there is a limit on the number of symbols that can be corrected, whether the number of errors and erasures to occur exceeds the limit, in other words, whether the overlay information is embeddable, needs to be checked before embedding the overlay information. Procedures of the checking whether the overlay information is able to be embedded are described in detail below.

Figure 5:
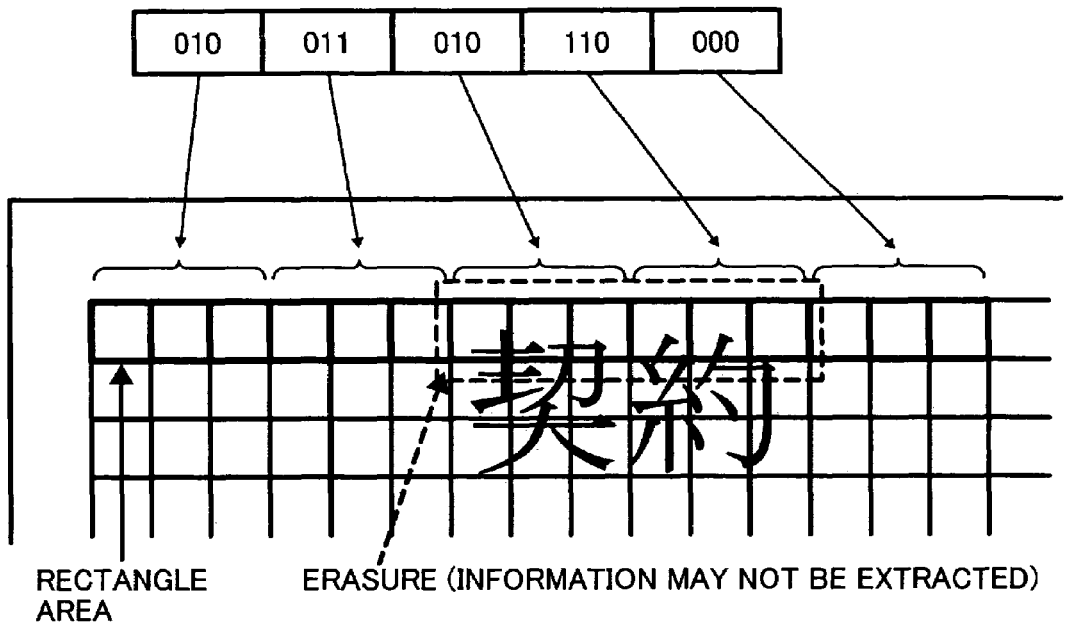
FIG. 5 is an illustration of bit-by-bit mapping of overlay information to rectangle areas of an original image.

The embed position determination mechanism 23 divides the original image acquired by the image acquisition mechanism 11 into a plurality of small rectangle areas as shown in FIG. 5. Further, the embed position determination mechanism 23 determines in what positions to embed respective bits of the overlay information by associating the overlay information with the rectangle areas. In detail, the overlay information is sequentially mapped bit by bit to rectangle areas from the top left rectangle area.

The embed evaluation mechanism 24 predicts from the determined positions which symbol is to have either an error or an erasure, and evaluates whether it is possible to embed the overlay information while ensuring later extraction of the original information.

Figure 6:
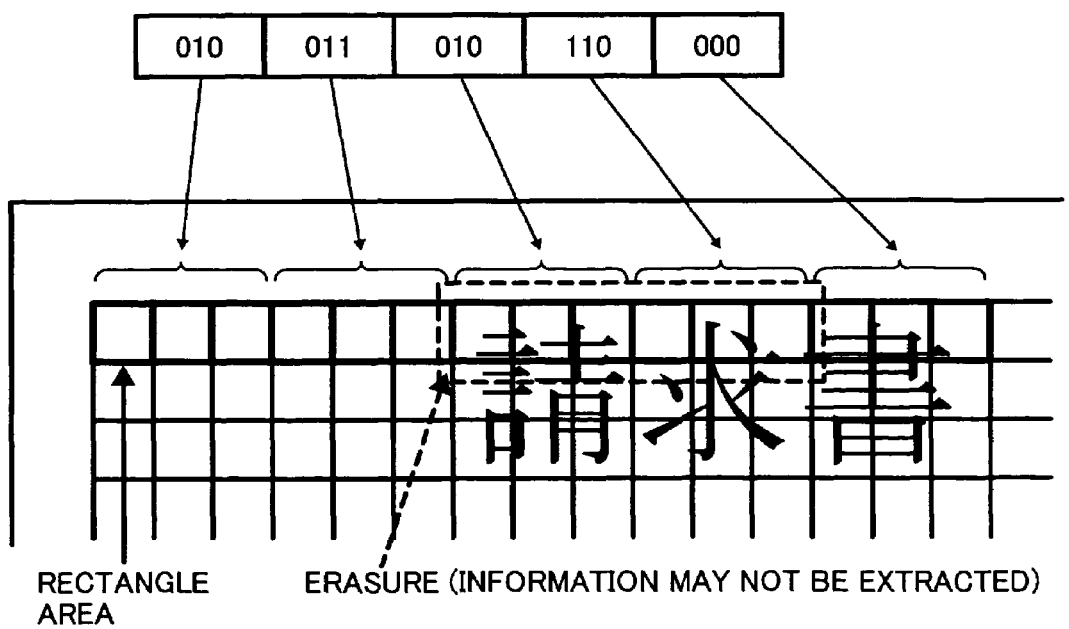
FIG. 6 is an illustration of bit-by-bit mapping of the overlay information to rectangle areas of another original image.

For example, as shown in FIG. 5, when overlay information includes first, second, third, fourth, fifth symbols, and the third and fourth symbols are to be superimposed on two letters in an original image, the third and fourth symbols are judged as erasure symbols. In the case, when the number of symbols that can be corrected by using correction information is two, the embed evaluation mechanism 24 judges that the overlay information is embeddable. On the other hand, when three symbols are judged as erasure symbols as shown in FIG. 6 although the number of symbols that can be corrected by using the correction information is two, the embed evaluation mechanism 24 judges that the overlay information is not embeddable.

Alternatively, it is conceivable that original information may be embedded in void areas having no letters so that the above procedures are not needed. However, particularly for a print material, the information may not be correctly extracted when one of the letters is added and a stain is left after the print material is printed. Therefore, in an example embodiment covered by the present invention, overlay information including original information and correction information is embedded in areas regardless of whether the areas are void or not, and any bit of the original information superimposed on a letter is recovered by using the correction information.

Figure 7:
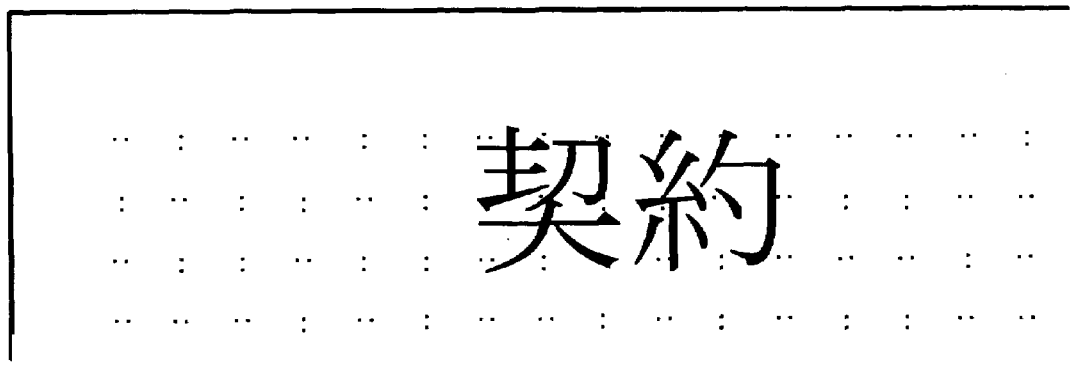
FIG. 7 is an illustration of a superimposed image in which overlay information is embedded by using the two types of dot patterns.

The image processing control mechanism 25 determines which operation to perform according to the result of the evaluation made by the embed evaluation mechanism 24. When the embed evaluation mechanism 24 judges that the overlay information is embeddable, the image processing control mechanism 25 embeds the overlay information in the original image, and outputs a resulting image. In detail, the image processing control mechanism 25 converts each bit of the overlay information to one of the two types of dot patterns, and superimposes the dot patterns on the original image according to the determined positions to create a superimposed image as shown in FIG. 7. The image processing control mechanism 25 outputs the superimposed image by using the color plotter 6.

On the other hand, when the embed evaluation mechanism 24 judges that the overlay information is not embeddable, the image processing control mechanism 25 does not embed the overlay information in the original image. In this case, the image processing control mechanism 25 does not output any image, and displays an alert message to notify a user that the information has not been embedded and no image is to be output. Alternatively, the image processing control mechanism 25 may output an original image without processing.

Figure 8:
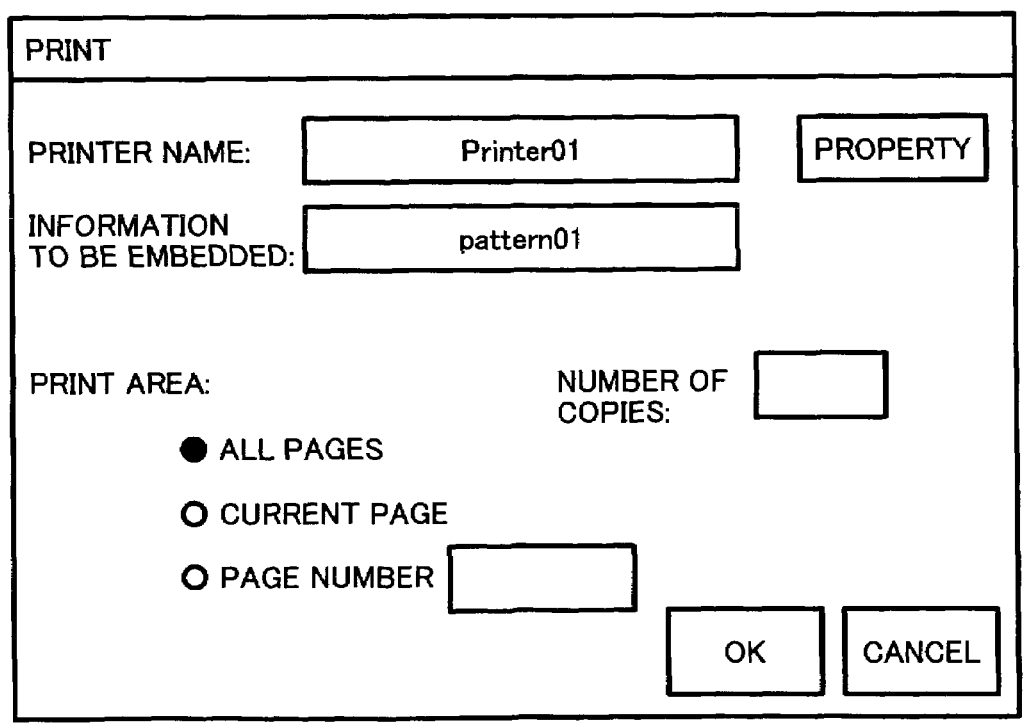
FIG. 8 is a schematic illustration of a property window to be displayed by a personal computer apparatus using the image processing apparatus.

A PC apparatus connected to the image processing apparatus 100 which uses the image processing apparatus 100 as a printer displays a property window as shown in FIG. 8 when, for example, the PC apparatus starts a printer driver through a document edit application. A user can input information to be embedded through the property window as appropriate. The user may specify an image file stored in a memory device (for example, a magnetic disk device) of the PC apparatus as the information to be embedded.

For embedding information according to an example embodiment of the present invention, for a purpose of detecting an alteration to an original image, data of the original image itself is used as the original information to be embedded. The data of the original image is encoded according to the above known method to generate overlay information. The overlay information is embedded to the original image, and a resulting image is printed. In other words, dot patterns representing the overlay information are superimposed on the original image, and a superimposed image is printed.

In order to check whether alteration is made on the original image, the printed superimposed image is scanned to acquire superimposed image data. As the superimposed image data includes data of the dot patterns representing the overlay information, the data of the dot patterns are extracted from the superimposed image data to obtain the overlay information.

Then, the obtained overlay information is decoded according to the above method of using the error/erasure-correcting codes to recover the original information. The recovered original information is dealt as reference image data representing the original image.

The reference image data is compared with image data derived by subtracting the data of the dot patterns from the superimposed image data. Any alteration to the original image, when made, can be detected from the comparison between the reference image data and the image data.

Further, a case of using the image processing apparatus 100 according to an example embodiment of the present invention to copy a document is described below.

A user sets a paper document to the image processing apparatus 100 so that the color scanner 5 reads the paper document, inputs information to be embedded by using the operation display mechanism 7, and instructs the image processing apparatus 100 to start copying.

Then, the system control mechanism 1 of the image processing apparatus 100 causes the color scanner 5 to scan the paper document to acquire an original image to be processed. Next, the input information is encoded according to the above method using the error/erasure correcting codes, and overlay information is generated. Further, the acquired original image is divided into a plurality of rectangle areas, and the overlay information is mapped bit by bit to the rectangle areas. Then, how errors and erasures may occur is checked to evaluate whether the overlay information is embeddable.

When the overlay information is judged as being embeddable, dot patterns representing the overlay information are superimposed on the original image to generate a superimposed image with the original information embedded. The image processing apparatus 100 outputs the superimposed image onto a sheet.

On the other hand, when the overlay information is judged as not being embeddable, an alert message notifying the user that the input information cannot be embedded is displayed on the operation display mechanism 7. The image processing apparatus 100 outputs the scanned paper document without processing onto a sheet. Alternatively, the image processing apparatus 100 may stop copying the paper document.

According to an example embodiment of the present invention, whether information is embeddable into an image is verified either before the image is printed or before the image is copied. As a result, once information is embedded, the information can be surely extracted from an issued material unless any alteration is made to the material. In other words, a function of so-called "verification before issuance" can be appropriately provided.

Figure 9:
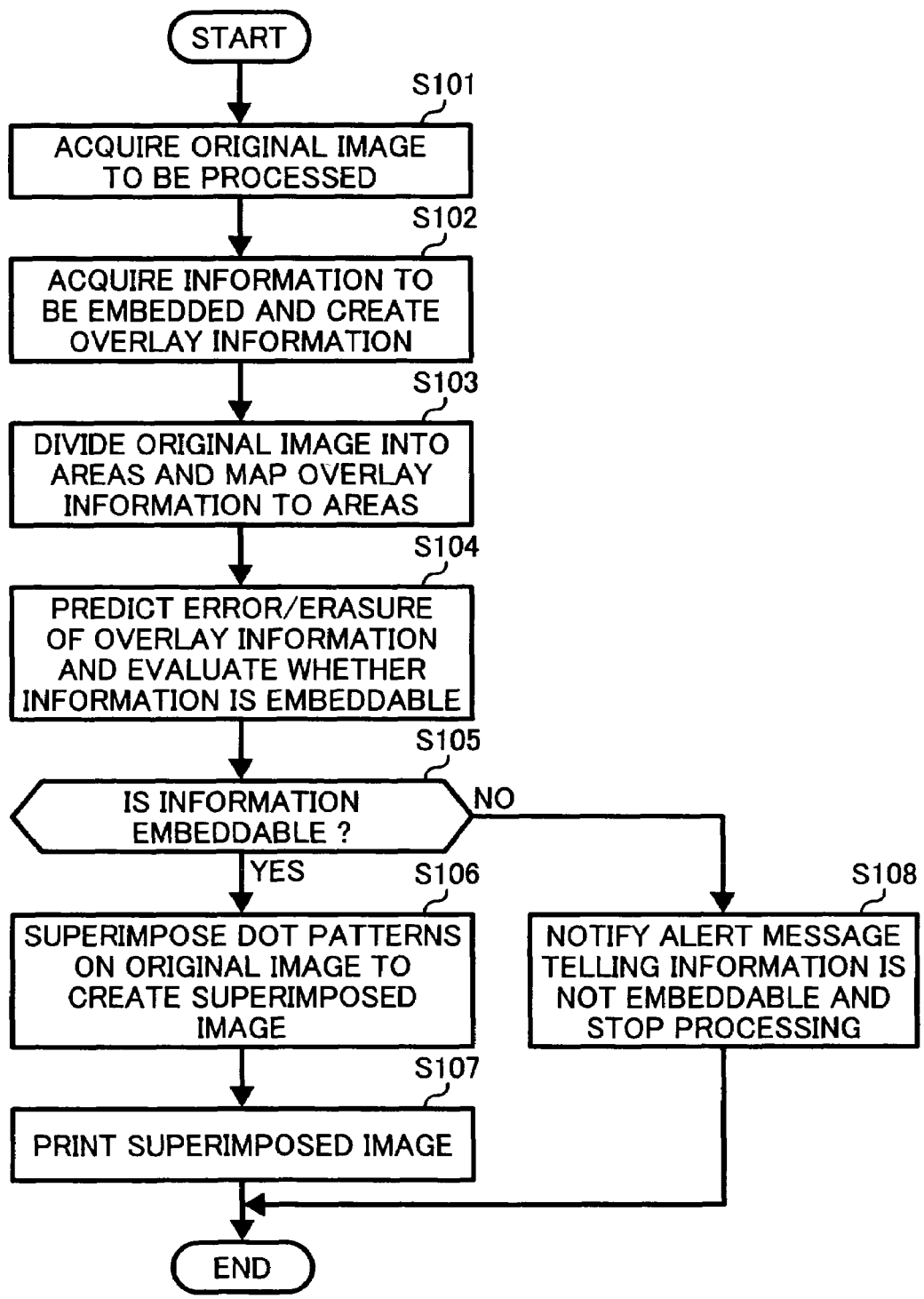
FIG. 9 is an operational flowchart of the system control mechanism of the image processing apparatus.

Next, an example of procedures covered by the system control mechanism 1 is described below referring to a flowchart in FIG. 9.

In step S101, an original image to be processed is obtained by using either the copy function or the print function. If the copy function is used, the original image refers to a scanned image obtained by using the color scanner 5. If the print function is used, the original image refers to an image prepared for printing.

In step S102, original information to be embedded is obtained, and overlay information is generated from the original information. If the copy function is used, the original information is specified by a user through the operation display mechanism 7. In the case the print function is used, the original information is provided through a host apparatus such as the PC apparatus.

In step S103, the original image is divided into a plurality of rectangle areas, and the overlay information is mapped bit by bit to the rectangle areas. In step S104, which symbol is to have either an error or an erasure is predicted according to the above method to evaluate whether the overlay information is embeddable.

In step S105, the evaluation is made. When a result of the evaluation made in step S105 is positive, dot patterns representing the overlay information are superimposed on the original image to create a superimposed image (step S106). In step S107, the superimposed image is recorded and output. When the result of the evaluation made in step S105 is negative, the image processing apparatus 100 outputs an alert message notifying the user that information is not embeddable is displayed, and stops processing (step S108).

Next, another example of the procedures of the system control mechanism 1 is described below referring to a flowchart in FIG. 10.

In step S201, an original image to be processed is obtained by using either the copy function or the print function. If the copy function is used, the original image refers to a scanned image obtained by using the color scanner 5. If the print function is used, the original image refers to an image prepared for printing.

In step S202, the original information to be embedded is obtained, and the overlay information is generated from the original information. If the copy function is used, the original information is specified by a user through the operation display mechanism 7. If the print function is used, the original information is provided through a host apparatus such as the PC apparatus.

In step S203, the original image is vided into a plurality of rectangle areas, and each bit of the overlay information is mapped to each of the rectangle areas. In step S204, which symbol is to have either an error or an erasure is predicted according to the above method, and whether the overlay information is embeddable is evaluated.

In step S205, the evaluation is made. When a result of the evaluation made in step S205 is positive, dot patterns representing the overlay information are superimposed on the original image to create a superimposed image (step S206). In step S207, the superimposed image is recorded and output. When the result of the evaluation made in step S205 is negative, then a setting is checked to evaluate whether the original image needs to be printed (step S208). When a result of the evaluation made in step S208 is positive, the image processing apparatus 100 records and outputs the original image (step S209). When the result of the evaluation made in step S208 is negative, the image processing apparatus 100 outputs an alert message notifying the user that information is not embeddable, and stops processing (step S210).

Although, in an example embodiment of the present invention, overlay information including original information and correction information is embedded as described above by using the two types of dot patterns including ". ." representing the bit "0" and ":" representing the bit "1", the way of embedding information is not limited thereto. Information may be embedded by adjusting spacing between any one of the lines, letters, or words. Alternatively, information may be embedded by adjusting the number of letters in each line. Even if an amount of information that can be embedded is limited, whether information can be surely embedded needs to be evaluated so as to control embed processing as in the case of using the two types of dot patterns.

Processing of embedding information in an original document by adjusting, for example, spacing between lines of text in the document is described below referring to FIGS. 11A and 11B.

Figure 11A:
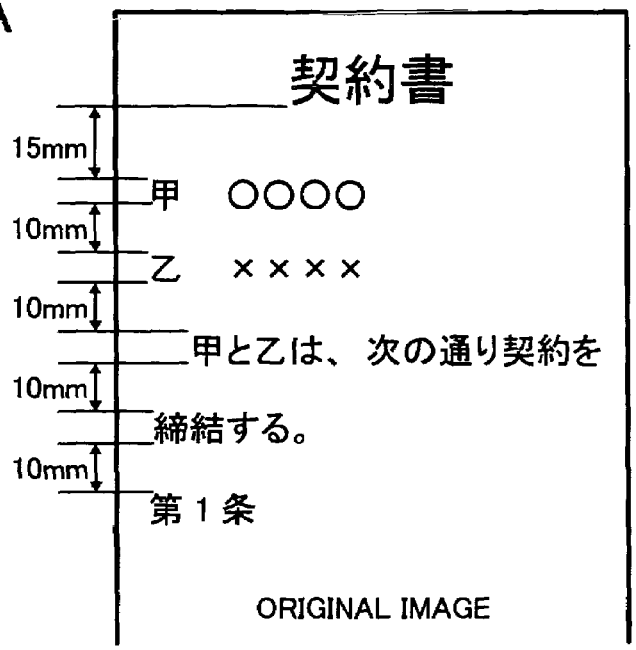
FIG. 11A is an illustration of an original document to be processed by the image processing apparatus.
Figure 11B:
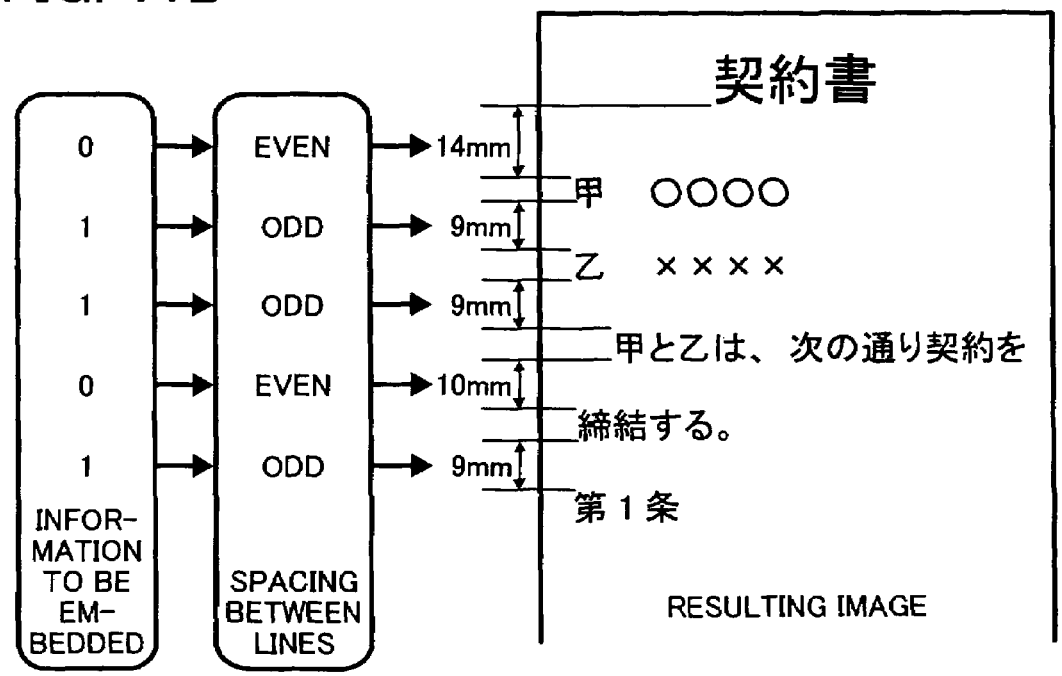
FIG. 11B is an illustration for explaining how to adjust spacing between lines of text to embed information in the original document shown in FIG. 11A.

FIG. 11A illustrates amounts of spaces between lines of text before processing. In embed processing, information is embedded by adjusting the spacing between lines according to a predetermined rule. For example, as shown in FIG. 11B, information including such bits as "01101" is embedded bit by bit in spaces between lines has a value of "0", a space between lines to which the bit is mapped is adjusted to have an odd number of height in units of mm. When a bit has a value of "1", a space between lines to which the bit is mapped is adjusted to have an even number of height in units of mm. In an example embodiment of the present invention, an adjustment of a space is made by reducing a height of the space, in other words, by narrowing the space. Alternatively, a space may be adjusted by widening the space.

In extraction processing, the embedded information is extracted from an image as described below.

The image to be processed is obtained, and rectangles each including a line of text are cut out of the image. Then, a height of each space between the rectangles is obtained. The embedded information is derived from the obtained heights according to the predetermined rule.

In the above method of embedding information in a document, an amount of information that can be embedded in the document largely depends on the contents of the document. An amount of information that can be embedded is equal to a number of spaces between lines of text included in the document. In the case of the document shown in FIG. 2, as the document includes nine lines of text, eight bits of information can be embedded.

Whether all information can be embedded needs to be evaluated before embedding the information. In a detailed example, a number of spaces between lines of text included in a document is compared with a number of bits included in information to be embedded.

The evaluation needs to be made also in the methods of embedding information by adjusting spacing between letters and spacing between words. The method using adjustment of spacing between words is adopted if a document includes text written in a language such as English in which adjusting spacing between letters significantly degrades an appearance of the document. On the contrary, if the text is written in a language such as Japanese in which text cannot be divided by words, it is appropriate that the method using adjustment of spacing between letters is adopted.

In the above example embodiments of the present invention, the image processing apparatus for performing the embed processing is not connected to a network environment. Alternatively, the present invention may be applied to an image processing apparatus which supports a network environment.

What is claimed as new and desired to be secured by Letters Patent of the United States is:

1. An image processing method, comprising:
acquiring an original image to be processed;
acquiring original information to be embedded;
generating overlay information including the original information;
determining a position in the original image to embed a bit of the overlay information;
evaluating whether the overlay information is embeddable in the original image; and
controlling image processing so as to select an image processing operation according to a result of the evaluation, wherein the controlling superimposes the overlay information on the original image to generate a superimposed image and outputs the superimposed image onto a sheet when the evaluating judges that the overlay information is embeddable, and the controlling outputs an alert message for notifying that the original information has not been embedded and no image is to be output when the evaluating judges that the overlay information is not embeddable.

2. The image processing method according to claim 1, wherein the controlling superimposes the overlay information on the original image to generate a superimposed image when the evaluating judges that the overlay information is embeddable.

3. The image processing method according to claim 1, wherein the image acquiring acquires the original image by reading a printed material.

4. The image processing method according to claim 1, wherein the generating generates correction information by encoding the original information according to a method using error/erasure-correcting codes and adds the correction information to the original information to generate the overlay information, the determining divides the original information into a plurality of small areas, and maps the overlay information bit by bit to the small areas, the evaluating predicts from the mapped areas which bit of the overlay information is to have one of an error or an erasure, evaluates whether all the errors and erasure to occur are correctable, and judges that the overlay information is embeddable when all the errors and erasures are correctable.

5. The image processing method according to claim 1, wherein the generating generates the overlay information directly from the original information, the determining maps the overlay information bit by bit to spaces between one of letters, words, or lines of text in the original image, and the evaluating evaluates whether a number of the spaces between one of the letters, words, or lines is enough to embed all the bits of the overlay information, and judges that the overlay information is embeddable when the text has enough number of spaces to embed the overlay information.

6. An image processing apparatus, comprising:
an image acquisition mechanism configured to acquire an original image to be processed;
an information acquisition mechanism configured to acquire original information to be embedded and to generate overlay information including the original information;
an embed position determination mechanism configured to determine a position in the original image to embed a bit of the overlay information;
an embed evaluation mechanism configured to evaluate whether the overlay information is embeddable in the original image; and
an image processing control mechanism configured to control image processing so as to select an image processing operation according to a result of the evaluation, wherein the image processing control mechanism is configured to superimpose the overlay information on the original image to generate a superimposed image and outputs the superimposed image onto a sheet when the embed evaluation mechanism judges that the overlay information is embeddable, and to output an alert message for notifying that the original information has not been embedded and no image is to be output when the evaluation mechanism judges that the overlay information is not embeddable.

7. The image processing apparatus according to claim 6, wherein the image processing control mechanism is configured to superimpose the overlay information on the original image to generate a superimposed image when the embed evaluation mechanism judges that the overlay information is embeddable.

8. The image processing apparatus according to claim 6, wherein the image acquisition mechanism is configured to acquire the original image by reading a printed material.

9. The image processing apparatus according to claim 6, wherein the information acquisition mechanism is further configured to generate correction information by encoding the original information according to a method using error/erasure-correcting codes, and to add the correction information to the original information to generate the overlay information, the embed position determination mechanism is further configured to divide the original information into a plurality of small areas, and to map the overlay information bit by bit to the small areas, the embed evaluation mechanism is configured to predict from the mapped areas which bit of the overlay information is to have one of an error or an erasure, to evaluate whether all the errors and erasure to occur are correctable, and to judge that the overlay information is embeddable when all the errors and erasures are correctable.

10. The image processing apparatus according to claim 6, wherein the information acquisition mechanism is configured to generate the overlay information directly from the original information, the embed position determination mechanism is further configured to map the overlay information bit by bit to spaces between one of letters, words, or lines of text in the original image, and the embed evaluation mechanism is further configured to evaluate whether a number of the spaces between one of the letters, words, or lines is enough to embed all the bits of the overlay information, and to judge that the overlay information is embeddable when the text has enough number of spaces to embed the overlay information.

11. An image processing apparatus, comprising:
an image acquisition mechanism configured to acquire an original image to be processed;
an information acquisition mechanism configured to acquire original information to be embedded, to generate correction information by encoding the original information according to a method using error/erasure-correcting codes, and to add the correction information to the original information to generate overlay information including the original information;
an embed position determination mechanism configured to determine a position in the original image to embed a bit of the overlay information, wherein the embed position determination mechanism divides the original information into a plurality of small areas, and maps the overlay information bit by bit to the small areas to generate mapped areas;
an embed evaluation mechanism configured to predict from the mapped areas which bit of the overlay information is to have one of an error or an erasure, to evaluate whether all the errors and erasure to occur are correctable, and to judge that the overlay information is embeddable when all the errors and erasures are correctable; and
an image processing control mechanism configured to control image processing so as to select an image processing operation according to a result of the evaluation.

12. An image processing apparatus, comprising:
an image acquisition mechanism configured to acquire an original image to be processed;
an information acquisition mechanism configured to acquire original information to be embedded and to generate overlay information including the original information directly from the original information;
an embed position determination mechanism configured to determine a position in the original image to embed a bit of the overlay information, wherein the embed position determination mechanism maps the overlay information bit by bit to spaces between one of letters, words, or lines of text in the original image;
an embed evaluation mechanism configured to evaluate whether a number of the spaces between one of the letters, words, or lines is enough to embed all the bits of the overlay information, and to judge that the overlay information is embeddable when the text has enough number of spaces to embed the overlay information; and
an image processing control mechanism configured to control image processing so as to select an image processing operation according to a result of the evaluation.

* * * * *